United States Patent [19]
Harris

[11] Patent Number: 5,543,051
[45] Date of Patent: Aug. 6, 1996

[54] BIOLOGICAL PHOSPHORUS REMOVAL FROM WASTE WATER

[75] Inventor: Scott Harris, Belrose, Australia

[73] Assignee: The Minister for Public Works and Services for and on Behalf of the State of New South Wales, Sydney, Australia

[21] Appl. No.: 433,330

[22] Filed: Jun. 19, 1995

[30] Foreign Application Priority Data

Nov. 6, 1992 [AU] Australia .................. PL5724

[51] Int. Cl.$^6$ .................. C02F 3/30; C02F 3/34
[52] U.S. Cl. .................. 210/605; 210/625; 210/903; 210/906
[58] Field of Search .................. 210/605, 623, 210/625, 626, 630, 630, 903, 906

[56] References Cited

U.S. PATENT DOCUMENTS

| | | | |
|---|---|---|---|
| 4,315,821 | 2/1982 | Climenhage | 210/605 |
| 4,500,429 | 2/1985 | Reimann et al. | 210/616 |
| 4,885,093 | 12/1989 | Schoenberger | 210/605 |
| 5,182,021 | 1/1993 | Spector | 210/605 |
| 5,213,681 | 5/1993 | Kos | 210/605 |
| 5,376,275 | 12/1994 | Roper | 210/605 |
| 5,380,438 | 1/1995 | Nungesser | 210/605 |

FOREIGN PATENT DOCUMENTS

| | | |
|---|---|---|
| 503074 | 3/1977 | Australia . |
| 13088/76 | 10/1977 | Australia . |
| 543212 | 7/1981 | Australia . |
| 17072/88 | 11/1988 | Australia . |
| 841010 | 8/1976 | Belgium . |
| 85318 | 8/1977 | Belgium . |
| 3716782A | 11/1987 | Germany . |
| 55-155798 | 12/1980 | Japan . |
| 56-065693 | 6/1981 | Japan . |
| 57-167800 | 10/1982 | Japan . |
| 58-146495 | 9/1983 | Japan . |
| 59-032999 | 2/1984 | Japan . |
| 59-036598 | 2/1984 | Japan . |
| 8701492A | 8/1987 | South Africa . |
| 1346587A | 10/1987 | U.S.S.R. . |
| WO91/14018 | 9/1991 | WIPO . |
| WO93/07089 | 4/1993 | WIPO . |
| WO93/11354 | 6/1993 | WIPO . |
| WO93/12044 | 6/1993 | WIPO . |
| WO93/13023 | 7/1993 | WIPO . |
| WO93/13846 | 7/1993 | WIPO . |
| WO94/06717 | 3/1994 | WIPO . |
| WO93/04990 | 3/1995 | WIPO . |
| WO93/04989 | 3/1995 | WIPO . |

*Primary Examiner*—Thomas G. Wyse
*Attorney, Agent, or Firm*—Barnes & Thornburg

[57] ABSTRACT

A method for waste water (1) treatment comprising the steps of: (a) combining waste water (1) with activated sludge (4) under anaerobic conditions; (b) transferring the products of step (a) to a container (B); (c) aerating the contents of the container (B); (d) allowing the contents of the container to settle and separate into an effluent layer (3) and an activated sludge layer; (e) decanting at least some of the treated effluent (3) and (f) recycling at least a proportion of the activated sludge (4) from step (d) to provide the sludge of step (a).

8 Claims, 1 Drawing Sheet

BIOLOGICAL PHOSPHORUS REMOVAL FROM WASTE WATER

TECHNICAL FIELD

The present invention relates to a waste water treatment, and in particular to the biological removal of phosphorus from waste water.

BACKGROUND ART OF THE INVENTION

Treatment of sewage and other waste water in its simplest form involves the mixing of waste water (food), air and micro-organisms to generate a biological process. This biological process breaks the "food" down into products more acceptable for disposal. The activated sludge ("AS") process developed in 1913 is now widely used, in various forms, for this purpose.

In the conventional activated sludge process, sewage, after primary screening and sedimentation, is passed into aeration tanks and then into a clarifier. A proportion of the biologically active sludge collected from the clarifier tank is recycled to the influent stream and constitutes about 25 to 200% of the inflow to the aeration tank. The balance of sludge is fed to an anaerobic sludge digestion unit.

In the aeration tanks, carbon-hydrogen compounds are oxidized as are reduced forms of sulphur, nitrogen and other elements. Nitrogen containing compounds are oxidized to nitrates ("nitrification"). In anoxic tanks nitrates are reduced to nitrogen gas ("denitrification").

In the sewerage treatment art, and as herein used, "anoxic" means in the absence of oxygen but presence of nitrate and "anaerobic" means in the absence of both oxygen and nitrate.

The activated sludge process has been developed as a continuous process in various forms, such as the Wuhrmann Process, the Ludzack-Ettinger and the Bardenpho processes. Those processes have in common that the influent is treated continuously and flows continuously in succession through a plurality of reactors in each of which the conditions are controlled for particular reaction conditions. Aerobic conditions are maintained in one or more reactors to promote nitrification and one, or more, reactors are maintained under anoxic conditions to promote denitrification. The outflow is settled and a proportion of the sludge is continuously recycled. These processes differ from one another primarily in the sludge recycling arrangements, the number of reaction chambers employed, and the selection of parameters used for primary control.

The continuous processes are capital intensive and useful for treating the wastewaters of large urban populations.

Along with development of the continuous process, the intermittent extended aeration process ("IEA") has been developed. In this process, a cyclic programme of aeration, settlement and decanting is performed in a single container. During the aeration phase, nitrification takes place. Anoxic conditions develop in the settlement phase during which denitrification occurs. The supernatant layer above the settled sludge is then decanted. Waste sludge is withdrawn and may be discharged to sludge lagoons or other sludge treatment process. During each step of the cycle, substantially the whole sludge content of the tank is subjected to the same conditions. The system is typically run with continuous inflow.

The IEA process in various forms has been operated with considerable success over 25 years or more and has the advantage that for communities of small to medium population, the plants are economical to construct, reliable, and relatively simple to control. The process generally achieves high removal of BOD, SS and nitrogen. It operates over a wide range of loads while tolerating rapid fluctuations in influent. Control is primarily achieved by regulation of oxygen input (aeration/non-aeration time) and sludge inventory.

In the 1970's interest developed in modifications to the continuous AS processes for the effective removal of phosphorus as well as nitrogen. The basic principle of biological phosphorus removal is the contact of "food" with micro-organisms under anaerobic conditions which cause the micro-organisms to convert soluble substrate to acetate while other selected microorganisms release phosphorus and absorb acetate. Under subsequent aeration, the stored acetate is used for energy production, for growth and to replenish the polyphosphate store. Thus, a greater amount of phosphorus is taken up than was released.

Nitrogen removal and phosphorus removal are to an extent competing processes because the presence of nitrates may inhibit phosphorus release and denitrification consumes soluble substrate needed for phosphorus removing bacteria growth.

Various modifications to the continuous process were proposed to achieve biological nitrogen and phosphorus removal, for example, the Phoredox and modified UCT processes. In consequence, the continuous processes became more complex to control and practical phosphorus removal required further increase in plant and operational complexity.

Since about 1982, various attempts have also been made to modify the IEA process to reduce concentration of phosphorus in addition to nitrogen. Typically, the unmodified IEA process achieves about 20% phosphorus removal. It has been shown that while aeration, settle, decant cycles were effective for nitrogen removal, removal of phosphorus with nitrogen can be achieved by introducing periodic anoxic mixing and sludge settling steps. Subsequent development has explored various strategies involving sequence including alternating cycles of anaerobic and aerobic conditions. However, to date, such IEA processes have not been operable with continuous feed, requiring that raw sewage be admitted only during the anaerobic phase. It has been found to be particularly difficult to control fluctuation in ammonia levels in the effluent and to maintain effluent ammonia concentrations of below 3 mg/L average. In general, the modified IEA processes hitherto proposed would be difficult to control and have not seemed practical.

An object of the present invention is to provide a process for waste water treatment which ameliorates at least some of the deficiencies of prior art. It is a further object to provide a process which retains the advantages of simplicity of control and comparatively low capital cost of the IEA treatment system while allowing for continuous inflow of waste water and resulting in effective phosphorus and nitrogen removal.

SUMMARY OF THE INVENTION

According to one aspect the invention consists in a method for waste water treatment including nitrogen and phosphorus removal comprising the steps of:

(a) combining waste water with activated sludge comprising a concentration of phosphorus accumulating bacteria together with other microorganisms in a first container under anaerobic conditions;

(b) transferring the products of step (a) to a second container;

(c) aerating the contents of the second container;

(d) allowing the contents of the second container to settle and separate into an effluent layer and an activated sludge layer;

(e) decanting at least some of the treated effluent;

(f) recycling at least a proportion of the activated sludge from the second container to provide the sludge of step (a); and (g) wasting at least part of the phosphorus enriched activated sludge from the second container.

In a preferred embodiment the ratio of activated sludge combined with waste water influent is in the range 0.5:1 to 3:1 sludge to waste water. Preferably, step (a) is carried out over 0.5 to 4 hours. Preferably also the product of step (a) from the anaerobic stage flow into the container of step (b) substantially continuously during step (c), more preferably during steps (c) and (d), and most preferably during all of the steps (c), (d) and (e).

In a preferred embodiment the method of the present invention further comprises the step of further denitrifying the recycled activated sludge in a third container prior to combining with the waste water of step (a). Preferably, at least some of the waste water of step (a) is added to the third container to promote denitrification of the activated sludge.

BRIEF DESCRIPTION OF THE DRAWINGS

The invention will now be more particularly described by way of example only with reference to the accompanying drawings wherein.

DETAILED DESCRIPTION OF THE INVENTION

Figure 1:
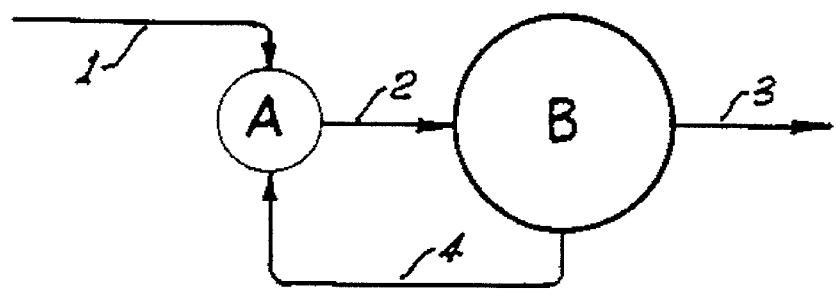
FIG. 1 is a schematic diagram showing a first embodiment of the invention.

With reference to FIG. 1 waste water influent is admitted via line 1 to reactor A wherein it is combined under anaerobic conditions with activated sludge from line 4. Activated sludge 4 is preferably substantially denitrified (as hereinafter described) and is combined in a ratio of between 0.5:1 and 3:1 of sludge to waste water. The optimum ratio depends upon the concentration of soluble substrate (readily biodegradable Chemical Oxygen Demand, or "RBCOD") and the concentration of phosphorus removing and other bacteria in the activated sludge stream. Retention time in reactor A is preferably in the range of 0.5 to 4 hours. The preferred configuration involves a plug flow. The optimum retention time is determined from the RBCOD concentration and the kinetic rate constant for the conversion of RBCOD to acetate.

Reactor A serves to react the RBCOD to produce acetate (e.g. by the action of other microorganisms or fatty acids under anaerobic conditions). The acetates are in turn taken up by the phosphorus removing bacteria which concomitantly release phosphorus into solution. This preconditions the phosphorus removing bacteria of the sludge in reactor A to take substantially all the phosphorus out of solution subsequently in tank B.

The product from reactor A comprises activated sludge including preconditioned phosphorus removing bacteria as well as wastewater depleted in soluble RBCOD and recycled activated sludge. This product flows via line 2 into tank B where an Intermittent Extended Aeration process takes place. The content of tank B is subjected to a sequence of treatments such as:

|    | (a) | (i)   | Aerate & fill  |
|----|-----|-------|----------------|
|    |     | (ii)  | Settle & fill  |
|    |     | (iii) | Decant & fill  |
| OR | (b) | (i)   | Aerate & fill  |
|    |     | (ii)  | Settle & fill  |
|    |     | (iii) | Decant         |
| OR | (c) | (i)   | Aerate & fill  |
|    |     | (ii)  | Settle         |
|    |     | (iii) | Decant         |

Sequence (a) (in which inflow to tank B from reactor A is continuous) is preferred as it allows the smallest volume tank and thus the lowest capital cost for a given influent average flow.

Nitrification and denitrification are obtained in tank B by controlling:

(a) relative time of aeration and non aeration, and/or (b) rate of aeration of the mixture.

It is possible to control the cycles in tank B so as to decant an effluent 3 low in ammonia, nitrate and phosphorus. As a result of preconditioning in reactor A, the phosphorus removing bacteria (e.g. Acinetobacter sp) remove substantially all the phosphorus from solution in tank B and is contained in the sludge of which a proportion is removed to waste. A proportion of the sludge is recycled preferably continuously, via line 4 to reactor A. Less preferably, a proportion of the sludge may be removed during, or at the end of, the settling cycle and be periodically recycled via line 4 to reactor A for combination with influent 1 as previously described.

In the process shown schematically in FIGS. 2, 3 and 4 parts of the diagram performing similar function to those described with reference to FIG. 1 are identified by numerals corresponding to those of FIG. 1.

Figure 2:
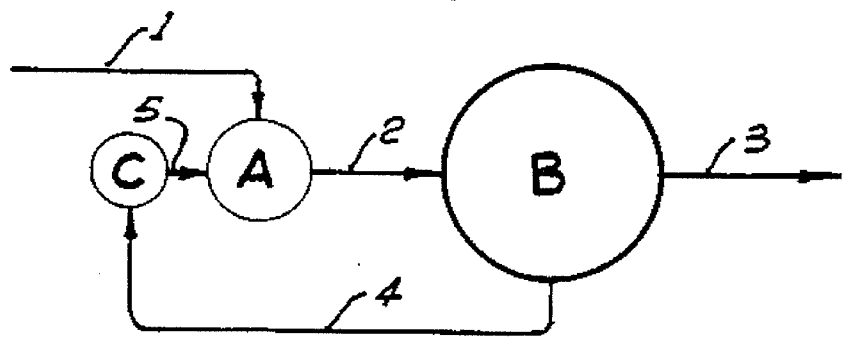
FIG. 2 is a schematic diagram showing a second embodiment of the invention.

The embodiment of FIG. 2 differs from that of FIG. 1 in that an anoxic tank C is used to denitrify continuously recycled sludge including some nitrate, or to hold sludge withdrawn from tank B after the settlement stage at which time the sludge is substantially denitrified. Although not shown in the drawings, a portion of anaerobic activated sludge 4 from reactor A may also be recycled either continuously or intermittently to tank C to enhance denitrication in tank C.

Figure 3:
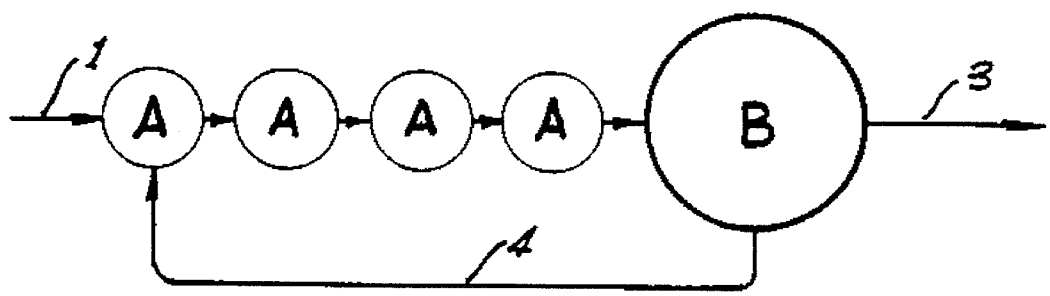
FIG. 3 is a schematic diagram showing a third embodiment of the invention.

In the embodiment shown schematically in FIG. 3, the sludge recycled via line 4 is combined with influent 1 in a series of 2 or more reactors A to approximate plug flow.

Figure 4:
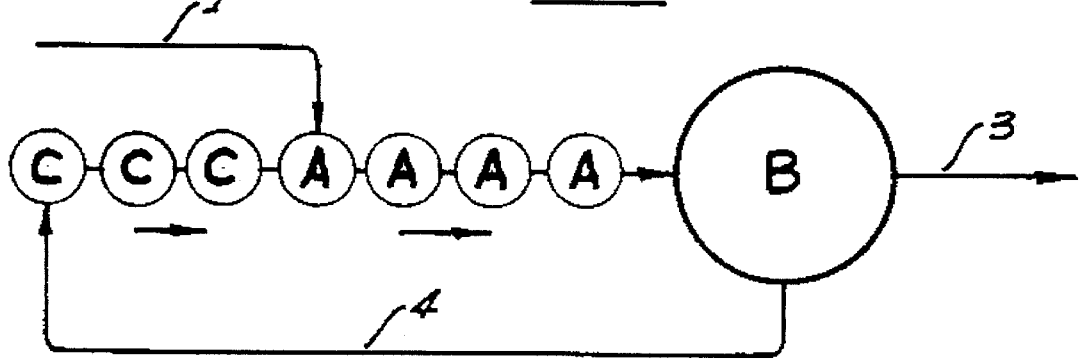
FIG. 4 is a schematic diagram showing a fourth embodiment of the invention.

In the embodiment shown schematically in FIG. 4, recycled sludge via line 4 is subjected to anoxic conditions in a plurality of tanks C prior to combination with influent 1. The influent is then combined with the sludge in a series of anaerobic reactors A, aft illustrated, or in a single anaerobic reactor A. Although not shown in the drawings a portion of activated sludge 4 from tank B in FIGS. 2 and 4 may be recycled to reactor A and activated sludge 4 from reactor A may be recycled to tank C and combined with waste water 1.

In the embodiments of FIGS. 2, 3 and 4 the sludge recycled via line 4 from reactor B is denitrified in an anoxic reactor C prior to combination with influent in reactor A. The retention time in reactor (or reactors) C is in the range of 0.5 to 3 hours and serves to remove any remaining nitrate in the sludge. The IEA process in tank B may be controlled to produce an effluent very low in ammonia which usually implies that some nitrates remain in the effluent. In some circumstances it is desirable to maintain a level of nitrate as high as 10 mg/L or more, but preferably less than 5 mg/L, so as to inhibit release of phosphorus into the effluent before or during decant. In that case further denitrification in reactor C is beneficial as otherwise the presence of nitrate would reduce the amount of RBCOD available for the phosphorus removing bacteria and is of particular benefit where the RBCOD concentration limits the degree of phosphorus removal achievable.

As will be understood by those skilled in the art, reactor A and/or reactor C may consist of a plurality of compartments in fluid communication with one another and separated by partitions and need not be physically separated reactors. Likewise reactor A and/or reactor C may be partitioned chambers within the IEA tank B and may be in fluid communication therewith provided that anaerobic conditions can be maintained in reactor A during aeration in tank B. Usually the reactors would be provided with mixing. The process may be provided with automatic monitoring of conditions such as redox potential, dissolved oxygen, flow, level, and the like and with automatic control in accordance with known practice.

The process of the invention retains the low capital cost and controls simplicity of the IEA process while achieving high levels of both nitrogen and phosphorus removal by decoupling the processes effective for removal of each. Importantly, nitrification is not compromised under cold weather conditions to obtain phosphorus removal and the process facilitates control of ammonia at low levels in the effluent.

Effluent standards of 1 mg/L ammonia nitrate 90 percentile can be obtained by this method.

Effluent phosphorus (as phosphate) levels of less than 1 mg/L are achievable with influent levels above 7 mg/L.

As will be apparent to those skilled in the art from the teaching hereof, the process of the invention can be embodied in other variations without departing from the scope of the concepts as herein described.

I claim:

1. A method for waste water treatment including nitrogen and phosphorus removal comprising the steps of:
   (a) combining waste water with activated sludge comprising a concentration of phosphorus accumulating bacteria together with other microorganisms in a first container under anaerobic conditions;
   (b) transferring the products of step (a) to a second container;
   (c) aerating the contents of the second container;
   (d) allowing the contents of the second container to settle and separate into an effluent layer and an activated sludge layer;
   (e) decanting at least some of the treated effluent;
   (f) recycling at least a proportion of the activated sludge from the second container to provide the sludge of step (a); and
   (g) wasting at least part of the phosphorus enriched activated sludge from the second container.

2. A method according to claim 1, wherein the activated sludge and waste water is present in a ratio of from 0.5:1 to 3:1 sludge to waste water.

3. A method according to claim 1, wherein step (a) is carried out over 0.5 to 4 hours.

4. A method according to claim 1, wherein flow of the resultant combination of sludge and waste water in step (a) from the anaerobic stage into the container of step (b) is substantially continuous during step (c).

5. A method according to claim 4, wherein the flow into the container of step (b) is substantially continuous during steps (c) and (d).

6. A method according to claim 4, wherein the flow into the container of step (b) is substantially continuous during steps (c), (d) and (e).

7. A method according to claim 1 further comprising the step of further denitrifying the recycled activated sludge in a third container prior to combining with the waste water of step (a).

8. A method according to claim 7, wherein at least some of the waste water of step (a) is added to the third container to promote denitrification of the activated sludge.

* * * * *